United States Patent
Arun

(10) Patent No.: US 8,433,570 B2
(45) Date of Patent: Apr. 30, 2013

(54) METHOD OF RECOGNIZING SPEECH

(75) Inventor: Uma Arun, Novi, MI (US)

(73) Assignee: General Motors LLC, Detroit, MI (US)

( * ) Notice: Subject to any disclaimer, the term of this patent is extended or adjusted under 35 U.S.C. 154(b) by 783 days.

(21) Appl. No.: 12/683,387

(22) Filed: Jan. 6, 2010

(65) Prior Publication Data

US 2011/0166858 A1 Jul. 7, 2011

(51) Int. Cl.
*G10L 15/06* (2006.01)

(52) U.S. Cl.
USPC ............................. 704/243; 704/235; 704/251

(58) Field of Classification Search .................. 704/243, 704/4, 7, 9, 10, 231, 235, 251, 255, 257, 704/270, 270.1
See application file for complete search history.

(56) References Cited

U.S. PATENT DOCUMENTS

| 5,602,960 | A | 2/1997 | Hon et al. | |
|---|---|---|---|---|
| 6,553,342 | B1 | 4/2003 | Zhang et al. | |
| 7,043,430 | B1 | 5/2006 | Chung et al. | |
| 7,181,391 | B1 | 2/2007 | Jia et al. | |
| 7,184,957 | B2 * | 2/2007 | Brookes et al. | 704/246 |
| 7,421,387 | B2 | 9/2008 | Godden | |
| 7,844,456 | B2 * | 11/2010 | Cai et al. | 704/243 |

OTHER PUBLICATIONS

Chow, Yen-Lu, et al., "The N-Best Algorithm: An Efficient Procedure for Finding Top N Sentence Hypotheses", BBN Sys&Tech Corp., p. 199-202, aclweb.org/anthology/H/H89/H89-2027.
Pais, Jorge, et al., "The N-Best Heuristic Search Algorithm", 4pgs, http://planning.cis.strath.ac.uk/plansig/pastsigs/salford-18/pais.
Rabiner, Lawrence R., "A Tutorial on Hidden Markov Models and Selected Applications in Speech Recognition", Proceedings of the IEEE, vol. 77, No. 2, Feb. 1989, pp. 257-286.

* cited by examiner

*Primary Examiner* — Huyen X. Vo
(74) *Attorney, Agent, or Firm* — Dierker & Associates, P.C.

(57) ABSTRACT

A method for recognizing speech involves presenting an utterance to a speech recognition system and determining, via the speech recognition system, that the utterance contains a particular expression, where the particular expression is capable of being associated with at least two different meanings. The method further involves splitting the utterance into a plurality of speech frames, where each frame is assigned a predetermined time segment and a frame number, and indexing the utterance to i) a predetermined frame number, or ii) a predetermined time segment. The indexing of the utterance identifies that one of the frames includes the particular expression. Then the frame including the particular expression is re-presented to the speech recognition system to verify that the particular expression was actually recited in the utterance.

20 Claims, 4 Drawing Sheets

METHOD OF RECOGNIZING SPEECH

TECHNICAL FIELD

The present disclosure relates generally to methods of recognizing speech.

BACKGROUND

Tonal-based languages such as, e.g., Mandarin, Min, Taiwanese, and Cantonese, include expressions associated with different meanings. The meaning of a particular word may change based, at least in part, on the tone with which the expression is spoken. In a speech recognition system, the tone may be recognized by a numerical identifier, where, for example, the numeral "1" indicates a high tone, the numeral "2" indicates a high/rising tone, the numeral "3" indicates a low/dipping tone, and the numeral "4" indicates a high/falling tone. For instance, the expression "ma1" may be the Mandarin equivalent of the English word "mother," whereas "ma3" may be the Mandarin equivalent of the word "horse".

Tonal-based languages also include expressions that, when misarticulated, sound substantially the same. An example of such an expression is the Mandarin equivalent of the English words "yes" and "no". More specifically, the Mandarin equivalent of the English word "yes" is "Shi4", whereas the Mandarin equivalent of the English word "no" is "Bu2 Shi4". In some cases, regarding the Mandarin equivalent of the word "no", the "Bu2" preceding "Shi4" may be misarticulated and/or unheard by, e.g., a speech recognition system, if the expression is spoken too quickly and/or with an improper tone. In such cases, the speech recognition system may construe the expression as simply "Shi4" (the Mandarin equivalent of "yes"), when the speaker really said "Bu2 Shi4" (the Mandarin equivalent of "no").

SUMMARY

A method of recognizing speech is disclosed herein. The method involves presenting an utterance to a speech recognition system and determining, via the speech recognition system, that the utterance contains a particular expression, where the particular expression is capable of being associated with at least two different meanings. The method further involves splitting the utterance into a plurality of speech frames, where each frame is assigned a predetermined time segment and a frame number, and indexing the utterance to i) a predetermined frame number, or ii) a predetermined time segment. The indexing of the utterance identifies that one of the frames includes the particular expression. Then the frame including the particular expression is re-presented to the speech recognition system to verify that the particular expression was actually recited in the utterance.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the method as disclosed herein may advantageously be used to properly identify an utterance, where such utterance includes an expression capable of being associated with at least two different meanings. The method and system may be particularly useful for properly identifying tonal-based language utterances. For instance, the examples of the method may be used to properly identify the utterance "Bu2 Shi4" (the Mandarin equivalent of the English word "no") which, when misarticulated, may be construed as the utterance "Shi4" (the Mandarin equivalent of the English word "yes"), and visa versa.

Figure 1:
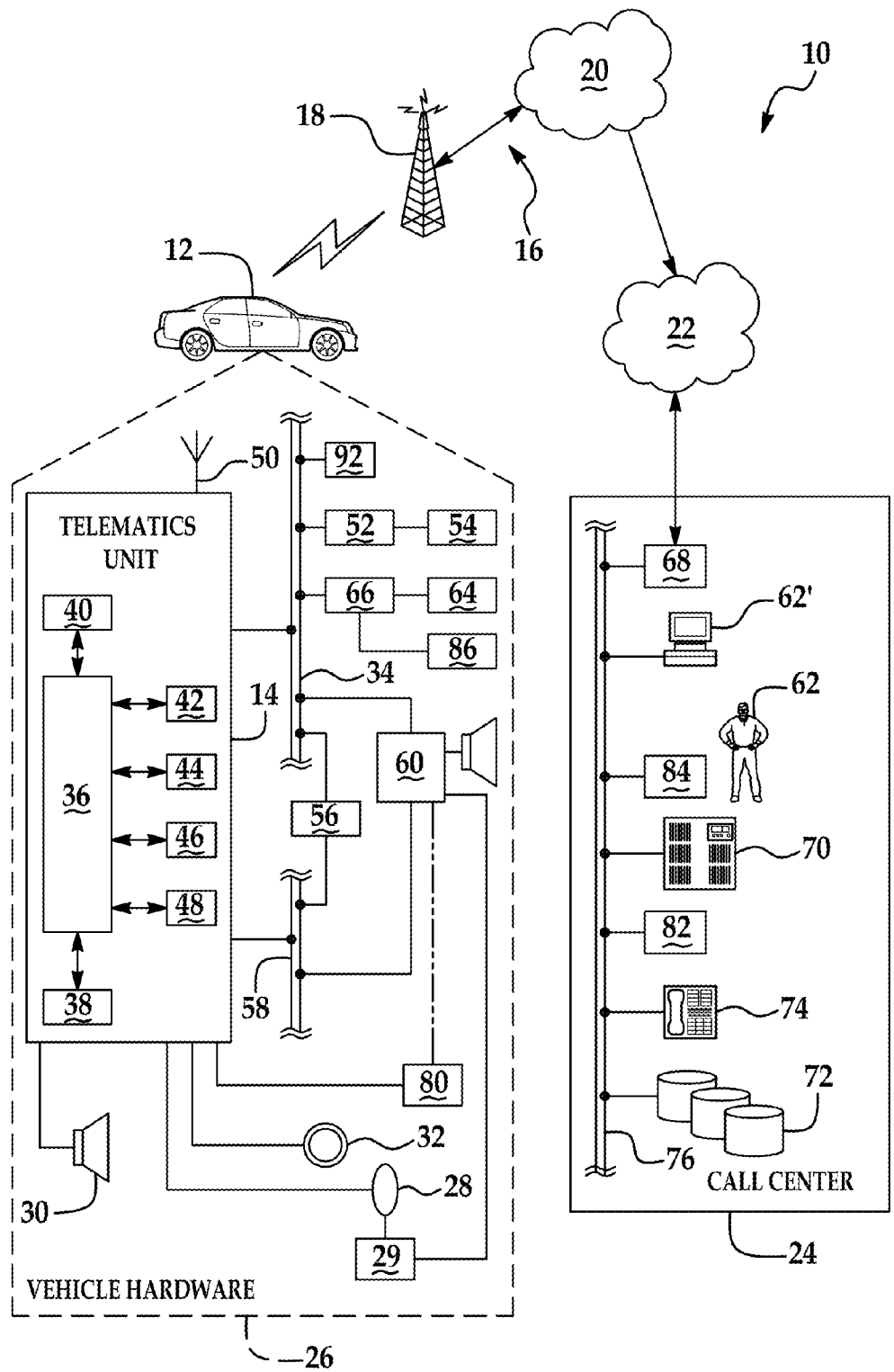
FIG. 1 is a schematic diagram depicting an example of a system for use with examples of the method of recognizing speech disclosed herein.

The method may be used by a speech recognition system, as either a stand-alone system or as a subsystem of another system (such as, e.g., being incorporated into a telematics equipped vehicle as shown in FIG. 1), to identify the utterance quickly and with a relatively high percentage of success. Furthermore, the identifying of the utterance may advantageously be accomplished for utterances spoken in any language, including the previously mentioned tonal languages, such as Mandarin.

As used herein, the term "user" includes a person or other living organism capable of reciting an utterance into a speech recognition system. In some instances, the "user" may also be a non-living entity, such as, e.g., an automaton, robot, or the like, that is also capable of reciting an utterance into a speech recognition system. In many cases, the term "user" may be used interchangeably with the phrase "source of the utterance". Furthermore, in instances where the speech recognition system is used in conjunction with a vehicle including, e.g., a telematics unit or other vehicle dedicated communications device, the term "user" may refer to a vehicle owner, operator, and/or passenger. In these instances, the term "user" may be used interchangeably with the term subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

It is to be further understood that "communication" is to be construed to include all forms of communication, including direct and indirect communication. As such, indirect communication may include communication between two components with additional component(s) located therebetween.

Also as used herein, the term "utterance" refers to a single unit of speech, where such unit includes one or more expressions. In a dialogue, a plurality of utterances may be used, where each utterance is separated by a user pause and/or a defined period of silence. Examples of utterances include, "Yes", "Please unlock the driver side door", "dial 248-555-5500", and the like. In the foregoing examples, the utterance "yes" includes one expression (i.e., the word "yes"), whereas the utterance "Please unlock the driver side door" includes six expressions (i.e., the words "please", "unlock", "the", etc.).

It is to be understood that the examples of the method disclosed herein may be performed in any system using speech recognition systems and/or software. Examples of such systems include, but are not limited to, data entry systems (such as systems used for entering credit card information for purchasing retail items, services, or the like), systems for preparing documents (such as systems used for preparing diagnostic or medical reports), speech-to-text computer systems (such as word processors or e-mail systems), systems used in mobile vehicles (such as systems using telematics units to obtain services, etc.), and/or the like. For purposes of illustration, the examples of the method will be described hereinbelow for use in conjunction with a telematics-equipped motor vehicle.

Referring now to FIG. 1, the system 10 includes a vehicle 12, a telematics unit 14, a wireless carrier/communication system 16 (including, but not limited to, one or more cell towers 18, one or more base stations and/or mobile switching centers (MSCs) 20, and one or more service providers (not shown)), one or more land networks 22, and one or more call centers 24. In an example, the wireless carrier/communication system 16 is a two-way radio frequency communication system.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein, and is configured to fulfill one or more user or subscriber requests. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands (such as, e.g., an utterance including "Bu2 Shi4"), and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

Figure 2:
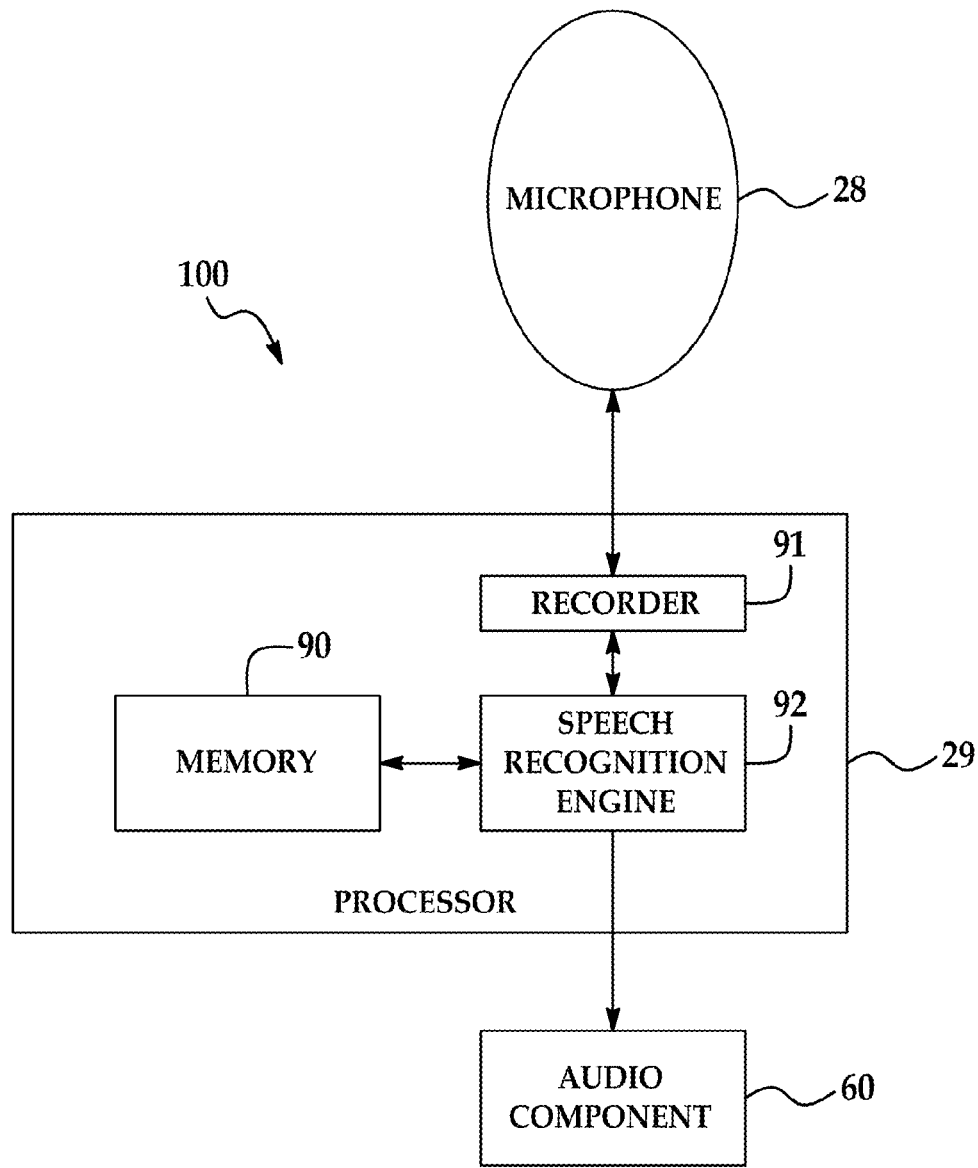
FIG. 2 is a schematic diagram depicting an example of a speech recognition system.

The microphone 28 is also selectively and operatively connected to a processor 29. As shown in FIG. 2, the processor 29 includes a memory 90, a recorder 91, and a speech recognition engine 92. The recorder 91 is initiated via some trigger, e.g., an in-vehicle button press, initiation of communication using the telematics unit 14, etc., and records utterances spoken into the microphone 28. Such recorded utterance(s) is/are transferred to the speech recognition engine 92, which is configured to run one or more software programs and/or software routines having computer readable code for performing various steps of the examples of the method described below. The memory 90 is configured to store information for use in performing the various steps of the method. For example, the memory 90 may be configured to temporarily store an N-best list dynamically generated by the speech recognition engine 92 when attempting to identify an expression included in a speaker utterance. The memory 90 may also be configured to run various programs and/or software routines to differentiate between the expressions "Bu2 Shi4" and "Shi4". Further details of the examples of the method will be described below in conjunction with FIGS. 3-4.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

The audio component 60 is also selectively and operatively connected to the processor 29. In at least some of the examples disclosed herein, the audio component 60 is also configured to recite, in response to a command from the processor 29, one or more possible expressions (generated by the speech recognition engine 92) to the source of the utterance (e.g., the user of the vehicle 12) to ultimately determine whether or not the utterance was identified correctly. Further details of these examples will also be described below.

The combination of the microphone 28, the processor 29 (including the memory 90, recorder 91, and the speech recognition engine 92), and the audio component 60 is referred to herein as a "speech recognition system", and is identified by reference numeral 100 in FIG. 2. For purposes of the examples of the method described herein, the speech recognition system 100 is a sub-system of the system 10 depicted in FIG. 1. To reiterate from above, the speech recognition system 100 may also be incorporated into other systems or, in some cases, may be used as a stand-alone system.

Referring back to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain the vehicle data for use by the telematics unit 14 or the call center 24 to determine the operation of the vehicle 12. Non-limiting example sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Wireless carrier/communication system 16 may be a cellular telephone system or any other suitable wireless system that transmits signals between the vehicle hardware 26 and land network 22. According to an example, wireless carrier/communication system 16 includes one or more cell towers 18, base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions. According to the example shown here, the call center 24 generally includes one or more switches 68, servers 70, databases 72, live and/or automated advisors 62, 62', a processor 84, as well as a variety of other telecommunication and computer equipment 74 that is known to those skilled in the art. These various call center components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs configured to accomplish a variety of call center 24 functions.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72. For example, database 72 may be designed to store subscriber profile records, subscriber behavioral patterns, or any other pertinent subscriber information.

It is to be appreciated that the call center 24 may be any central or remote facility, manned or unmanned, mobile or fixed, to or from which it is desirable to exchange voice and data communications.

Furthermore, a cellular service provider (not shown) generally owns and/or operates the wireless carrier/communication system 16. It is to be understood that, although the cellular service provider (not shown) may be located at the call center 24, the call center 24 is a separate and distinct entity from the cellular service provider. In an example, the cellular service provider is located remote from the call center 24. A cellular service provider provides the user with telephone and/or Internet services, while the call center 24 is a telematics service provider. The cellular service provider is generally a wireless carrier (such as, for example, Verizon Wireless®, AT&T®, Sprint®, etc.). It is to be understood that the cellular service provider may interact with the call center 24 to provide various service(s) to the user.

Figure 3:
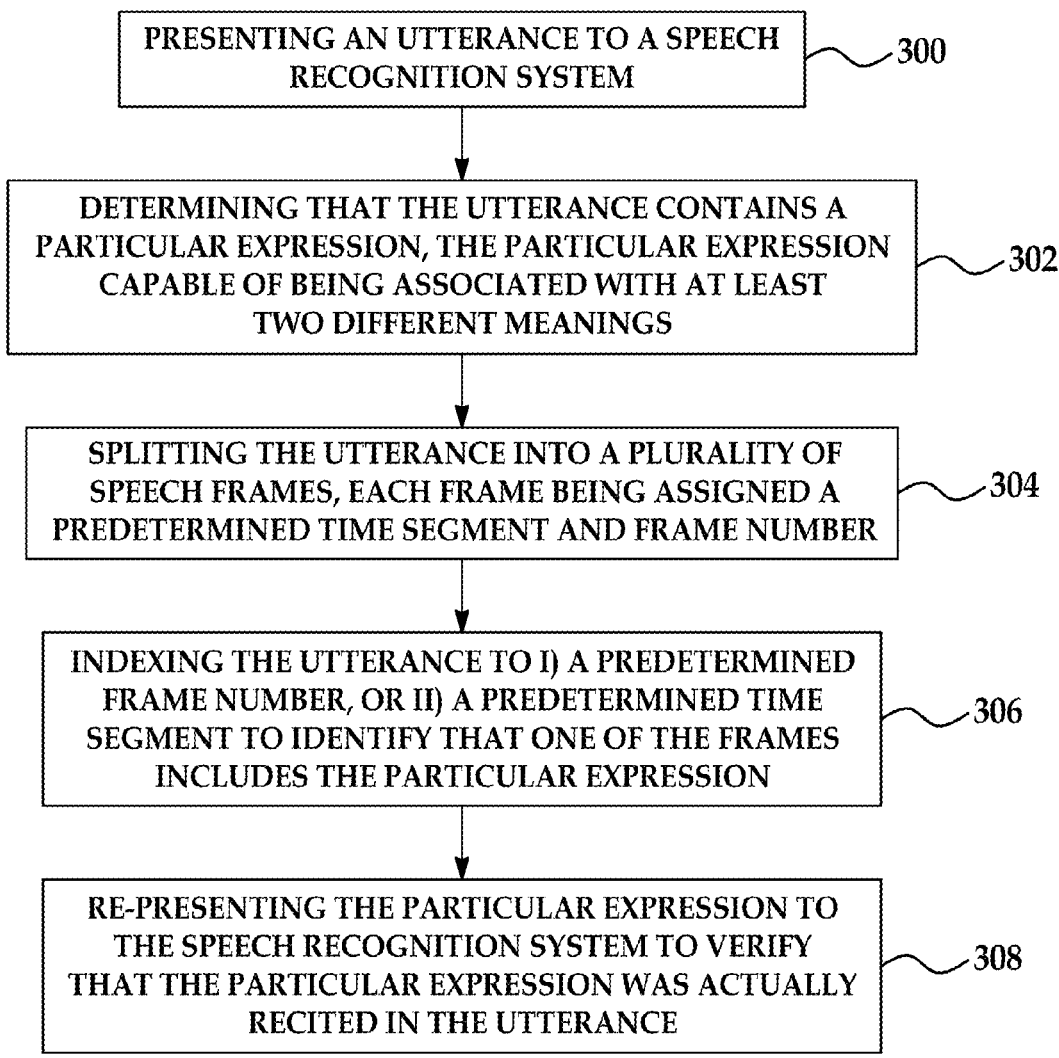
FIG. 3 is a flow diagram depicting an example of a method of recognizing speech.

An example of a method of recognizing speech is generally depicted in FIG. 3. The method generally includes: presenting an utterance to the speech recognition system 100 (as shown by reference numeral 300); determining that the utterance contains a particular expression, the particular expression capable of being associated with at least two different meanings (as shown by reference numeral 302); splitting the utterance into a plurality of speech frames, each frame being assigned a time segment and a frame number (as shown by reference numeral 304); indexing the utterance to i) a predetermined frame number, or ii) a predetermined time segment to identify that one of the plurality of frames includes the particular expression (as shown by reference numeral 306); and re-presenting the particular expression to the speech recognition system 100 to verify that the particular expression was actually recited in the utterance (as shown by reference numeral 308).

Figure 4:
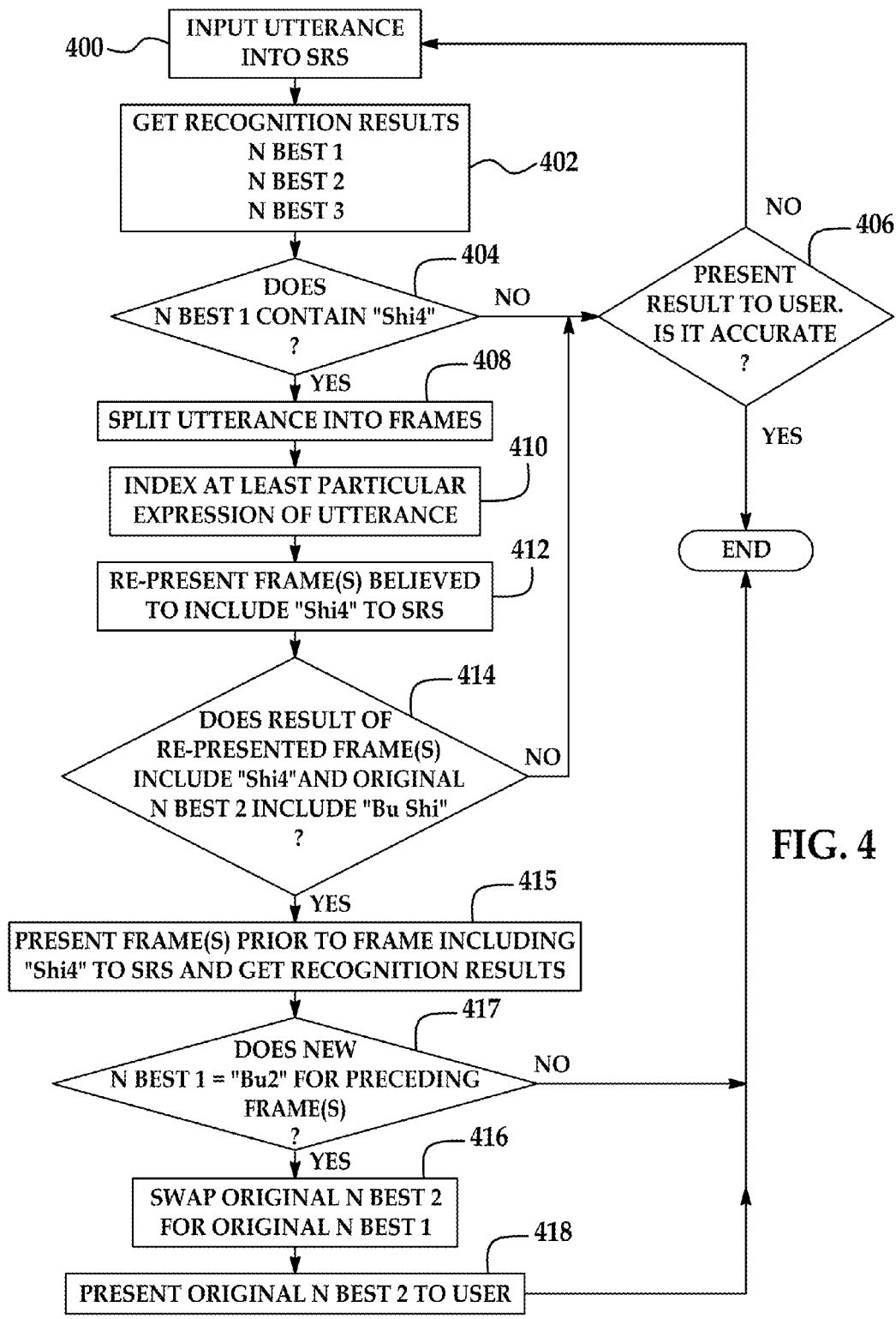
FIG. 4 is a flow diagram depicting another example of a method of recognizing speech.

FIG. 4 illustrates a more detailed example of the method disclosed herein, and thus the steps of FIG. 3 will be further described throughout the discussion of FIG. 4. At the outset and as shown at reference numeral 400 in FIG. 4, the presenting of the utterance to the speech recognition system 100 may be accomplished by verbally reciting the utterance into the microphone 28. The system 100 listens for a response after prompting the user to speak (e.g., via a visual or audible signal). The microphone 28 and associated electronics are activated, and there is a listening window during which incoming speech energy is recorded and digitized. More particularly, the microphone 28 converts the acoustical pressure waves (sound) of the utterances into electrical signals which are transmitted to and recorded by the recorder 91. The recorded utterance is then automatically transmitted to the speech recognition engine 92 (referred to as "SRS" in FIG. 4) of the processor 29.

The utterance may include an alphabetic sequence alone or, in some cases, an alphabetic sequence in combination with a numeric sequence. As one example, the user may recite "no, my phone number is 248-555-5510" into the microphone 28. The portion of the utterance including "no, my phone number is" is considered to be an alphabetic sequence, whereas the portion of the utterance including "248-555-5510" is considered to be a numeric sequence.

Once the utterance has been presented to the speech recognition system 100, the speech recognition engine 92 may apply appropriate programs and/or software routines to determine whether or not the utterance includes a particular expression. In one example, the engine 92 compares the digitized representation of words and expressions of the utterance and compares them to digitized representations of words and expressions specified by a grammar In another example, the engine 92 compares the digitized representations of the spoken words to those previously identified and stored in a database (e.g., housed in memory 90).

As used herein, the term "particular expression" refers to an expression (e.g., a word or part of a word) that is capable of being associated with at least two different meanings, and thus is capable of being misinterpreted. When the expression is recognized, further analysis of the expression is often required to determine which meaning was intended by the source of the utterance. In the example provided in FIG. 4, the particular express "Shi4" is used. "Shi4" is considered to be a particular expression because "Shi4" used alone is the Mandarin equivalent of the word "yes" (i.e., a first meaning), while "Shi4" used in combination with "Bu2" is the Mandarin equivalent of the word "no" (i.e., a second meaning).

In an example, whether or not the utterance includes a particular expression may be determined from an N-best list dynamically generated by the speech recognition engine 92 at the time the utterance is recited into the microphone 28. As used herein, an "N-best list" is a list of possibilities that an utterance could be. The N-best list may be generated using an N-best algorithm (run, e.g., by the speech recognition engine 92) to determine an N number of possibilities and a ranking (i.e., a confidence score) for each of the possibilities (i.e., 1-best possibility, 2-best possibility, etc.). The N-best algorithm may, for example, be a Viterbi-style search algorithm that uses a hidden Markov model based on a sequence of previously observed outputs obtained from a plurality of users during a speech testing process. With reference to the instant disclosure, the N-best list may be generated for the particular expression included in the utterance presented to the speech recognition system 100. The N number of most likely possibilities has associated therewith a confidence score, which is mathematically determined by the N-best algorithm. The possibilities are then ranked from a highest possibility in sequential order to a lowest possibility based on the confidence scores. For example, the N-best list for the utterance in the example of FIG. 4 may include "Shi4" as the 1-best (or first-best) possibility if it has the highest confidence score, "Bu2 Shi4" as the 2-best possibility if it has the next highest confidence score, and so on.

Accordingly, in an example, the user recites an utterance into the microphone 28. Upon receiving the utterance, the speech recognition engine 92 of the speech recognition system 100 dynamically generates the N-best list for the utterance to determine if the utterance includes a particular expression such as, e.g., "Shi4" (as shown by reference numeral 402 in FIG. 4). From the N-best list, the speech recognition engine 92 identifies the first-best possible utterance, which is ranked the highest among the possible utterances included in the N-best list. Then, the speech recognition engine 92 determines whether or not the first-best possible utterance includes the particular expression, in this example "Shi4" (as shown by reference numeral 404 in FIG. 4).

In instances where the engine 92 determines that the first-best possible utterance does not include the expression "Shi4", the speech recognition engine 92 may then submit a command to the audio component 60 to recite the first-best possible utterance back to the user (as shown by reference numeral 406 in FIG. 4). The user will either i) verify the utterance, or ii) indicate that the utterance is incorrect. In instances where the user indicates that the utterance recited by the audio component 60 is incorrect, he/she may render such indication either verbally (e.g., by talking into the microphone 28) or physically (e.g., via a button press indicating as such). When making such an indication, the method starts over and accepts a new utterance from the user. However, if the user verifies that the first-best possible utterance is correct, then the method ends because the utterance clearly did not contain the particular expression and the telematics unit 14 may fulfill or attempt to fulfill the user's initial request (e.g., the requested phone number is dialed, the user is put into communication with the call center 24, etc.).

In instances where the speech recognition engine 92 determines that the first-best possible utterance contains the particular expression (e.g., "Shi4"), the speech recognition engine 92 then applies appropriate programs and/or software routines to determine which expression was actually uttered (i.e., so that the wrong meaning is not relayed and so that the in-vehicle systems 14, 29 do not respond incorrectly to a user request). In the example of FIG. 4, the speech recognition engine 92 applies the appropriate programs and/or software routines to determine whether or not the expression "Bu2" preceded the "Shi4" expression (indicating a "no" response), or if the utterance included "Shi4" alone (indicating a "yes" response). First, however, the speech recognition engine 92 determines whether or not "Shi4" was in fact recited in the utterance. Such may be accomplished by splitting the entire utterance into a plurality of speech frames, where each frame includes a digitized form of a portion of the utterance (as shown by reference numeral 408 in FIG. 4). Then the utterance is indexed to identify the speech frame that is statistically likely to include "Shi4" (as shown by reference numeral 410 in FIG. 4). It is to be understood that this portion of the method is accomplished as an attempt to verify the presence of "Shi4", and not to identify the presence of any words preceding the particular expression. This is due, at least in part, to the fact that the word(s) preceding the particular expression often have low energy levels that may be interpreted (at this point) by the engine 92 as noise. As illustrated herein, additional steps are undertaken to identify the presence of any preceding word(s) after the presence of the particular expression is verified.

When the original utterance is split into frames, each frame is assigned a predetermined time segment and frame number. In an example, the utterance is split into 10 frames, where each frame has substantially the same time segment (e.g., 10 ms) and thus the total time duration of the segments together is 100 ms. Each frame may then be assigned to a predetermined frame number (e.g., first frame, second frame, . . . tenth frame, etc.) and/or a predetermined time segment (e.g., 1-10 ms, 11-20 ms, . . . 91-100 ms, etc.). Such assignment(s) may be used to subsequently identify the frame that is believed to include the particular expression. When a grammar and lexicon are developed, many speakers are used to repeat and record utterances, such as yes, no, cat, dog, etc. These utterances are statistically normalized in a corpus. These statistics may be used to configure the speech recognition system 100 so that it is able to identify the frame that is most likely to include the particular expression based upon the statistical results. As such, the speech recognition system is able to index the particular expression in one of the frames according to the programmed statistics, as shown at reference numeral 410. In the example provided in FIG. 4, it has been found that when the "Bu2 Shi4" utterance is recorded, "Shi4" resides around the $10^{th}$ frame (or the time segment of 91-100 ms) when partitioned at 10 ms intervals, and thus the particular expression, "Shi4", may be indexed into such frame. It is to be understood, however, that the frame in which the particular segment is present may depend, at least in part, upon when the recorder 91 begins recording in relation to when the user begins speaking, the rate at which the user speaks, etc.). Such nuances may result in misrecognition of the user's utterance, and will require verification from the user or re-presentation of the original prompt to the user. It is to be further understood that the utterance may otherwise be split into any number of frames and/or the time segment may vary from frame to frame as necessary (e.g., based upon the statistics available) in order to properly index the particular expression for re-presentation to the speech recognition system 100.

Once the utterance (or at least the particular expression) is indexed, and the frame and/or time segment believed to contain the particular expression is identified, the method further includes re-presenting the frame believed to include the expression (and, in some instances, those frames following such frame) to the speech recognition system 100 to verify that the expression was actually recited in the utterance (as shown by reference numeral 412 in FIG. 4). The speech recognition engine 92 reprocesses the identified frame(s) believed to include the particular expression in an attempt to verify that the expression was uttered. In one example, such reprocessing and verification may be accomplished by the speech recognition engine 92 by comparing the digitized expression within the particular frame to a grammar and/or digitized representation of the expression in a database. If there is a close match, the expression is supplied with a high probability word association and placed in a new N-best list.

In another example, such reprocessing and verification may be accomplished by the speech recognition engine 92 by measuring the digitized speech energy of the expression(s) in the identified frame and comparing that value to the digitized speech energy generally associated with the particular expression. If the speech energies are close (e.g., within a 5% error), then the presence of the expression (e.g., "Shi4") is verified by the speech engine 92.

Upon making the determination that the particular expression is part of the utterance, the speech recognition system 100 may then refer back to the original N-best list to determine if the other expression (e.g., "Bu2") was identified in the list in combination with the particular expression (e.g., "Shi4") (i.e., where the combination of the words has a different meaning than the expression "Shi4" alone) (as shown by reference numeral 414 in FIG. 4). The presence of "Bu2 Shi4" in the original N best list indicates that this utterance may have been spoken instead of just "Shi4". Such an utterance may be misinterpreted due, at least in part, to the "Bu2" form of the utterance being classified as noise in the initial speech recognition results. When this ambiguity (i.e., between the original N-best list and the results of the re-presented frames) is present, the system 100 is designed to reprocess, for example, the other frames (e.g., the first ten frames) to identify the presence or absence of the additional expression (described further hereinbelow).

The identification of another expression appended to the particular expression in the original N-best list may be accomplished, for example, by scanning all of the other possibilities in the original N-best list and choosing, via the speech recognition engine 92 (using an appropriate software routine), the next highest ranked possibility from the list that includes "Bu" prefixed to "Shi4".

If the original N-best list does not contain another possibility that includes "Bu2", then the original result (i.e., "Shi4" alone) will be presented to the user for verification (as also shown by reference numerals 414 and 406 in FIG. 4). If the user indicates (via any of the methods described above) that "Shi4" is correct, then the method ends. On the other hand, if the user indicates that "Shi4" is not correct, then the method starts over after repeating the utterance into the speech recognition system 100 at step 400 in FIG. 4.

If "Bu2" is present in another of the N-best possibilities from the original recognition results/original N-best list (indicating that i) another expression may have been uttered, and ii) the utterance has potentially been misclassified), the speech recognition engine 92 may also determine whether or not any speech energy is present in the utterance at, before or after the frame number or time segment including the particular expression (e.g., "Shi4") (see, e.g., reference numerals 415 and 417). This may be accomplished by presenting the other frames to the speech recognition engine 92 for processing. The speech recognition engine 92 measures the digitized speech energy of the expression(s) in the presented frame(s) and compares the measured value to the digitized speech energy generally associated with the other expression. Without being bound by any theory, it is believed that the presence of some speech energy (as measured or detected by the speech recognition engine 92) in one or more of the frames preceding (or, depending upon the expression, the frames following) the frame that includes the particular expression indicates that another expression was in fact uttered immediately preceding (or following) the particular expression. For example, when "Shi4" is identified as having been uttered in the tenth frame, and the ambiguity in the results is present (see reference numeral 414), it is desirable to check if "Bu2" was actually uttered prior to the tenth frame (i.e., prior to the utterance of "Shi4"). In another example, when "successful" is identified as having been uttered in a particular statistically identified frame, it is desirable to check if "un" was uttered prior to that frame. In many examples, the presence of one other expression changes the meaning of the particular expression. As such, in many instances, when any other expression is identified in the other frame(s), it is believed to be a particular other expression. For example, when the particular expression is "Shi4", it is believed that if another expression does precede "Shi4", the expression is most likely "Bu2" (which is identified by the structure of the grammar during processing of the other frame(s)).

It is believed that since the speech recognition engine 92 is reviewing and processing the other frame(s) in isolation from the frame including the particular expression (e.g., "Shi4"), the engine 92 is capable of determining whether speech energy in the other frame(s) is actually another expression or is, in fact, noise.

After processing the other frame(s) to identify the other expression, another N-best list is generated for such frame(s). As depicted at reference numeral 417, the engine 92 checks whether the new 1-best possibility is "Bu2". If the new 1-best possibility is "Bu2", then the system 100 concludes with statistical confidence that the original utterance included both expressions (e.g., "Bu2 Shi4", or "no"). After the presence of the other expression is verified, the system 100 swaps the original 2-best possibility (e.g., "Bu2 Shi4") for the 1-best possibility (i.e., the phrase including "Shi4" and not "Bu2"), as shown by reference numeral 416 in FIG. 4). This new possibility will then be presented to the user for verification (as shown by reference numeral 418 in FIG. 4). However, if there is more than one other possibility (in the original N-best list) that includes "Bu2" appended to "Shi4", then generally the highest ranking possibility (i.e., the "Bu2" and "Shi4" possibility having the highest confidence score among all possibilities including such expressions) is selected. This selected alternate phrase is swapped with the previously identified first-best possibility and is presented to the user (as shown at reference numeral 418).

Although the examples of the method disclosed hereinabove use "Shi4" as the particular expression, it is to be understood that such examples may also be applied for other particular expressions which, when concatenated with other expressions, change or negate the meaning of the original expression. Non-limiting examples of such expressions and other expressions include "dial" and "re-dial" or "plan route" and "re-plan route". It is further to be understood that the examples of the method may also be applied to any language having similar expressions, not necessarily limited to tonal-based languages.

While several examples have been described in detail, it will be apparent to those skilled in the art that the disclosed examples may be modified. Therefore, the foregoing description is to be considered exemplary rather than limiting.

The invention claimed is:

1. A method of recognizing speech, comprising:
presenting an utterance to a speech recognition system;
determining, via the speech recognition system, that the utterance contains a particular expression, the particular expression capable of being associated with at least two different meanings;
splitting the utterance into a plurality of speech frames, each frame being assigned a predetermined time segment and a frame number;

indexing the utterance to i) a predetermined frame number, or ii) a predetermined time segment, the indexing identifying that one of the plurality of frames includes the particular expression; and re-presenting the one of the plurality of frames including the particular expression to the speech recognition system to verify that the particular expression was actually recited in the utterance.

2. The method as defined in claim 1 wherein prior to the splitting, the method further comprises:

generating an N-best list for the recited utterance, the N-best list including a plurality of possible utterances, each of which potentially corresponds with the recited utterance, wherein each of the plurality of possible utterances is ranked according to a confidence score; and identifying a first-best possible utterance from the N-best list, the first-best possible utterance being ranked the highest among the plurality of possible utterances according to its confidence score, wherein the first-best possible utterance contains one meaning of the particular expression.

3. The method as defined in claim 2 wherein the one of the plurality of frames includes a digitized form of the particular expression.

4. The method as defined in claim 2 wherein upon verifying that the particular expression was actually recited in the utterance, the method further comprises:

identifying an other possible utterance from the N-best list, the other possible utterance including an other expression appended to the particular expression that associates an other meaning with the particular expression;

presenting at least one frame preceding the one of the plurality of frames including the particular expression to the speech recognition system to verify that the other expression was actually recited in the utterance;

swapping the first-best possible utterance with the other possible utterance from the N-best list when the other expression is verified; and presenting the other possible utterance to a source of the utterance.

5. The method as defined in claim 1 wherein prior to splitting the plurality of speech frames, the method further comprises:

generating an N-best list for the recited utterance, the N-best list including a plurality of possible utterances, each of which potentially corresponds with the recited utterance, wherein each of the plurality of possible utterances is ranked according to a confidence score;

identifying a first-best possible utterance from the N-best list, wherein the first-best possible utterance does not contain the particular expression; and presenting the first-best possible utterance to a source of the utterance.

6. The method as defined in claim 1 wherein after verifying that the particular expression was actually recited in the utterance, the method further comprises determining whether speech energy is present in the utterance before the one of the plurality of frames including the particular expression, the presence of the speech energy indicating that one meaning of the particular expression is present in the utterance.

7. The method as defined in claim 6, further comprising prompting a source of the utterance to verify that the one meaning of the particular expression is accurate.

8. The method as defined in claim 1 wherein the utterance is derived from a tonal language, and wherein an English equivalent of the two different meanings of the particular expression include "yes" and "no".

9. The method as defined in claim 2 wherein upon verifying that the particular expression was actually recited in the utterance, the method further comprises:

recognizing that an other possible utterance from the N-best list does not contain an other meaning of the particular expression; and presenting the first-best possible utterance from the N-best list to a source of the utterance.

10. A speech for recognizing speech, comprising:

a microphone configured to receive an utterance from a source, the utterance potentially containing a particular expression, wherein the particular expression is capable of being associated with at least two different meanings;

a processor selectively and operatively connected to the microphone, the processor including:

computer readable code for determining that the utterance contains the particular expression;

computer readable code for splitting the utterance into a plurality of speech frames, each frame being assigned a predetermined time segment and a frame number; and computer readable code for indexing the utterance to i) a predetermined frame number, or ii) a predetermined time segment, the indexing identifying that one of the plurality of frames includes the particular expression; and means for re-presenting the one of the plurality of frames including the particular expression to the speech recognition system to verify that the particular expression was actually recited in the utterance.

11. The system as defined in claim 10 wherein the processor further includes:

computer readable code for generating an N-best list for the utterance, the N-best list including a plurality of possible utterances, each of which potentially corresponds with the utterance, wherein each of the plurality of possible utterances is ranked according to a confidence score; and computer readable code for identifying a first-best possible utterance from the N-best list, the first-best possible utterance being ranked the highest among the plurality of possible utterances according to its confidence score, wherein the first-best possible utterance contains one meaning of the particular expression.

12. The system as defined in claim 11 wherein the processor further includes:

computer readable code for identifying an other possible utterance from the N-best list, the other possible utterance including an other expression appended to the particular expression that associates an other meaning with the particular expression;

computer readable code for presenting at least one frame preceding the one of the plurality of frames including the particular expression to the speech recognition system to verify that the other expression was actually recited in the utterance; and computer readable code for swapping the first-best possible utterance with the other possible utterance from the N-best list when the other expression is verified.

13. The system as defined in claim 12, further comprising an audio component configured to present, in response to a command from the processor, the other possible utterance to a source of the utterance.

14. The system as defined in claim 11 wherein the processor further includes computer readable code for recognizing that an other possible utterance from the N-best list does not contain an other meaning of the particular expression.

15. The system as defined in claim 10 wherein the processor further includes:
   computer readable code for generating an N-best list for the utterance, the N-best list including a plurality of possible utterances, each of which potentially corresponds with the utterance, wherein each of the plurality of possible utterances is ranked according to a confidence score; and
   computer readable code for identifying a first-best possible utterance from the N-best list, wherein the first-best possible utterance does not contain the particular expression.

16. The system as defined in claim 15, further comprising an audio component configured to present, in response to a command from the processor, the first-best possible utterance to a source of the utterance.

17. The system as defined in claim 10 wherein the processor further includes computer readable code for determining whether speech energy is present in the utterance before the one of the plurality of frames including the particular expression, the presence of the speech energy indicating that one meaning of the particular expression is present in the utterance.

18. The system as defined in claim 17, further comprising an audio component configured to prompt a source of the utterance to verify that the one meaning of the particular expression is accurate.

19. The system as defined in claim 10 wherein the utterance is derived from a tonal language, and wherein an English equivalent of the two different meanings of the particular expression includes "yes" and "no".

20. The system as defined in claim 10 wherein the system is configured to be used in a mobile vehicle.

* * * * *